US012585980B2

(12) United States Patent
Chattopadhyay et al.

(10) Patent No.: US 12,585,980 B2
(45) Date of Patent: Mar. 24, 2026

(54) ANNOTATION OF TIME SERIES DATA AND VALIDATION FOR GENERATING MACHINE LEARNING MODELS

(71) Applicant: Tata Consultancy Services Limited, Mumbai (IN)

(72) Inventors: Tanushyam Chattopadhyay, Kolkata (IN); Arijit Ukil, Kolkata (IN); Avijit Sur, Kolkata (IN); Prateep Misra, Kolkata (IN); Arpan Pal, Kolkata (IN); Soma Bandyopadhyay, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1063 days.

(21) Appl. No.: 17/366,810

(22) Filed: Jul. 2, 2021

(65) Prior Publication Data

US 2022/0092474 A1 Mar. 24, 2022

(30) Foreign Application Priority Data

Aug. 28, 2020 (IN) .............................. 202021037237

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | |
|---|---|---|---|
| 11,518,391 B1 * | 12/2022 | Sanchez | B60W 40/09 |
| 2017/0308802 A1 * | 10/2017 | Ramsøy | G06N 20/00 |
| 2020/0387755 A1 * | 12/2020 | Hagen | G06F 18/2155 |
| 2021/0306368 A1 * | 9/2021 | Zhang | H04L 63/1433 |

OTHER PUBLICATIONS

Patricia Bota et al., "A Semi-Automatic Annotation Approach for Human Activity Recognition," Sensors, 2019, vol. 19, MDPI, https://www.researchgate.net/publication/330642155_A_Semi-Automatic_Annotation_Approach_for_Human_Activity_Recognition/link/5c4bb7dc299bf12be3e40a13/download.
Ksenia Konyushkova et al. "Learning to Reduce Annotation Load," Computer Science, 2019, vol. 19, MDPI, https://infoscience.epfl.ch/record/262811?In=en.
Nisha Talagala, "ECO: Harmonizing Edge and Cloud with ML/DL Orchestration," Computer Science, 2018, Usenix Org, https://www.usenix.org/system/files/conference/hotedge18/hotedge18-papers-talagala.pdf.

* cited by examiner

*Primary Examiner* — Markus A. Vasquez
(74) *Attorney, Agent, or Firm* — Finnegan, Henderson, Farabow, Garrett & Dunner, LLP

(57) ABSTRACT

Conventionally, applying analytics on dataset is the scarcity of labelled data. With increase of data there is cost fact effecting nature of servicing required for data (e.g., cost in terms of resource and time and effort is high for data annotation). Though data is analysed, it may be prone to error. Present disclosure provides systems/methods for reducing volume of data to be annotated for time series data thereby reducing time and effort of resources, thus resulting in effective utilization of system's resources (e.g., memory, processor, etc.). More specifically, the method of the present disclosure adaptively modifies the volume of the data to be annotated based on the performance of the unsupervised learning method applied in the system. Moreover, in the absence of an annotation mechanism for clusters of time series data, meta data associated with the time series data is utilized for annotation and validation of dataset.

9 Claims, 2 Drawing Sheets

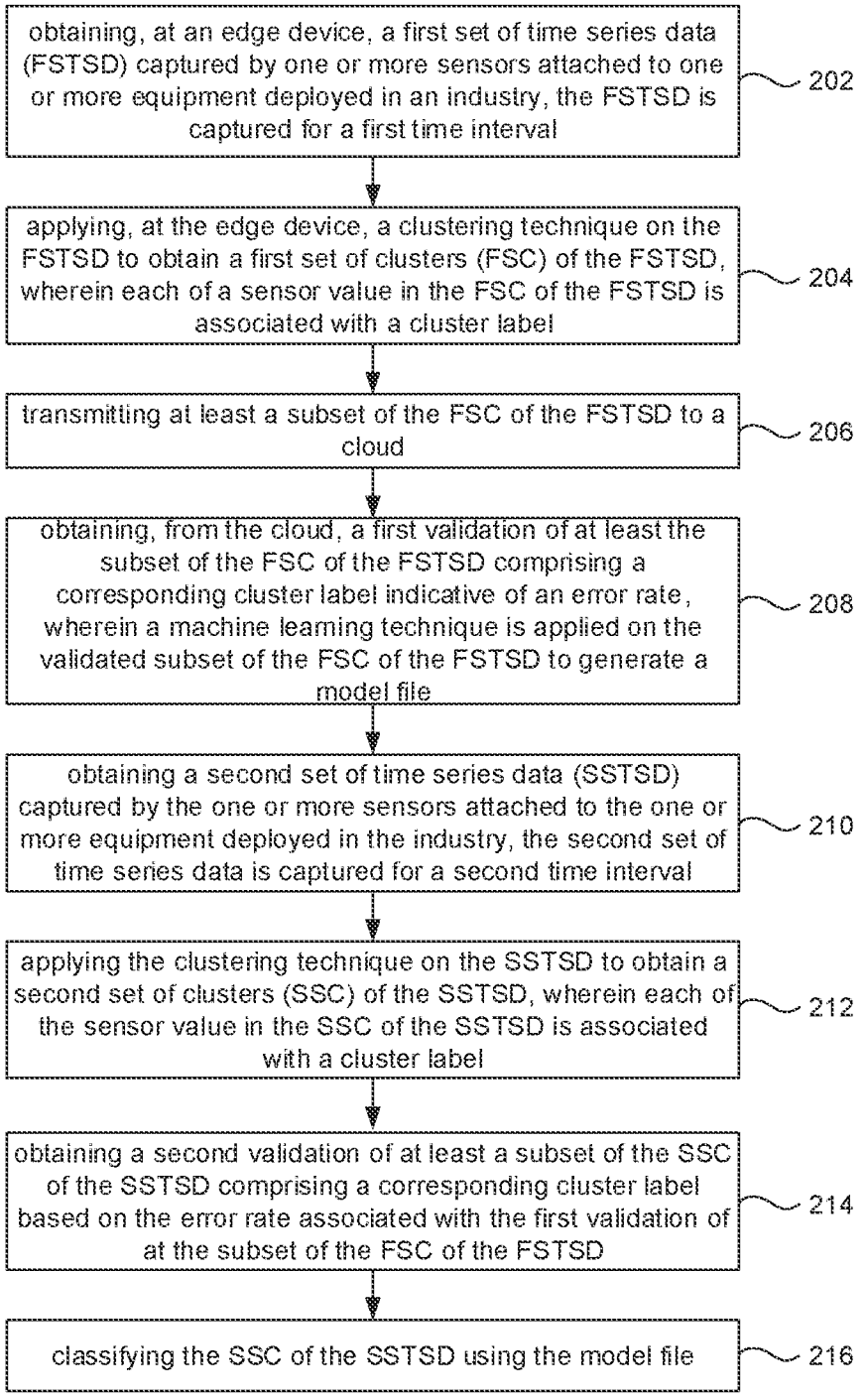

obtaining, at an edge device, a first set of time series data (FSTSD) captured by one or more sensors attached to one or more equipment deployed in an industry, the FSTSD is captured for a first time interval — 202 applying, at the edge device, a clustering technique on the FSTSD to obtain a first set of clusters (FSC) of the FSTSD, wherein each of a sensor value in the FSC of the FSTSD is associated with a cluster label — 204 transmitting at least a subset of the FSC of the FSTSD to a cloud — 206 obtaining, from the cloud, a first validation of at least the subset of the FSC of the FSTSD comprising a corresponding cluster label indicative of an error rate, wherein a machine learning technique is applied on the validated subset of the FSC of the FSTSD to generate a model file — 208 obtaining a second set of time series data (SSTSD) captured by the one or more sensors attached to the one or more equipment deployed in the industry, the second set of time series data is captured for a second time interval — 210 applying the clustering technique on the SSTSD to obtain a second set of clusters (SSC) of the SSTSD, wherein each of the sensor value in the SSC of the SSTSD is associated with a cluster label — 212 obtaining a second validation of at least a subset of the SSC of the SSTSD comprising a corresponding cluster label based on the error rate associated with the first validation of at the subset of the FSC of the FSTSD — 214 classifying the SSC of the SSTSD using the model file — 216

FIG. 2

ANNOTATION OF TIME SERIES DATA AND VALIDATION FOR GENERATING MACHINE LEARNING MODELS

PRIORITY CLAIM

This U.S. patent application claims priority under 35 U.S.C. § 119 to: India Application No. 202021037237, filed on Aug. 28, 2020. The entire contents of the aforementioned application are incorporated herein by reference.

TECHNICAL FIELD

The disclosure herein generally relates to analysis and validation of time series data, and, more particularly, to annotation of time series data and validation for generating machine learning models.

BACKGROUND

The major problem for applying analytics on real or real-time dataset is the scarcity of the labelled data. On the other hand, supervised machine learning (ML) models produce better performance in comparison to unsupervised machine learning models. In a real-world scenario, due to advancement of technology, volume of data has tremendously increased. With the increase of data there is cost fact effecting the nature of servicing required for the data. For instance, cost in terms of resource and time and effort is high for data annotation. Further, though data is analyzed, the analyzed data may be prone to error.

SUMMARY

Embodiments of the present disclosure present technological improvements as solutions to one or more of the above-mentioned technical problems recognized by the inventors in conventional systems. For example, in one aspect, there is provided a processor implemented method for annotating time series data and validating thereof for generating machine learning models. The method comprises obtaining, at an edge device, a first set of time series data captured by one or more sensors attached to one or more equipment deployed in an industry, the first set of time series data is captured for a first time interval; applying, at the edge device, a clustering technique on the first set of time series data to obtain a first set of clusters of the first set of time series data, wherein each of a sensor value in the first set of clusters of the first set of time series data is associated with a cluster label; transmitting, by the edge device, at least a subset of the first set clusters of the first set of time series data to a cloud; obtaining, at the edge device from the cloud, a first validation of at the subset of the first set clusters of the first set of time series data, wherein the step of obtaining the first validation of at least the subset of the first set of clusters of the first set time series data comprising obtaining the first validation of the cluster label associated with each of the sensor value in the first set of clusters of the first set time series data, wherein the first validation of the cluster label associated with each of the sensor value in the first set of clusters of the first set time series data is indicative of an error rate, and wherein a machine learning technique is applied on the validated subset of the first set of clusters of the first set of time series data to generate a model file; obtaining a second set of time series data captured by the one or more sensors attached to the one or more equipment deployed in the industry, the second set of time series data is captured for a second time interval; applying the clustering technique on the second set of time series data to obtain a second set of clusters of the second set of time series data, wherein each of the sensor value in the second set of clusters of the second set of time series data is associated with a cluster label; obtaining a second validation of at least a subset of the second set of clusters of the second set of time series data, wherein the step of obtaining a second validation of at least the subset of the one or more clusters of the first time series data comprising obtaining a second validation of the label associated with each of the sensor value in the one or more clusters of the second set of time series data, and wherein selection and validation of the subset of the second set of clusters of the second set of time series data is based on the error rate associated with the first validation of at the subset of the first set of clusters of the first set of time series data; and classifying the second set of clusters of the second set of time series data using the model file.

In an embodiment, the clustering technique is a density-based clustering technique.

In an embodiment, the first validation of at the subset of the first set of clusters of the first set of time series data and the second validation of at the subset of the second set clusters of the second set of time series data are based on at least one of (i) a user input, and (ii) meta data indicative of an operating status of the one or more sensors.

In an embodiment, validation of subsequent subsets of one or more clusters of subsequent set of time series data captured by the one or more sensors attached to the one or more equipment deployed is performed until the error rate reaches a pre-defined threshold.

In another aspect, there is provided a processor implemented method for annotating time series data and validating thereof for generating machine learning models. The system comprises a memory storing instructions; one or more communication interfaces; and one or more hardware processors coupled to the memory via the one or more communication interfaces, wherein the one or more hardware processors are configured by the instructions to: obtain, at an edge device, a first set of time series data captured by one or more sensors attached to one or more equipment deployed in an industry, the first set of time series data is captured for a first time interval; apply, at the edge device, a clustering technique on the first set of time series data to obtain a first set of clusters of the first set of time series data, wherein each of a sensor value in the first set of clusters of the first set of time series data is associated with a cluster label; transmit at least a subset of the first set clusters of the first set of time series data to a cloud; obtain, from the cloud, a first validation of at the subset of the first set clusters of the first set of time series data, wherein the first validation of at the subset of the first set of clusters of the first set time series data comprises obtaining the first validation of the cluster label associated with each of the sensor value in the first set of clusters of the first set time series data, wherein the first validation of the cluster label associated with each of the sensor value in the first set of clusters of the first set time series data is indicative of an error rate, and wherein a machine learning technique is applied on the validated subset of the first set of clusters of the first set of time series data to generate a model file; obtain a second set of time series data captured by the one or more sensors attached to the one or more equipment deployed in the industry, the second set of time series data is captured for a second time interval; apply the clustering technique on the second set of time series data to obtain a second set of clusters of the second set of time series data, wherein each of the sensor value in the second set of clusters of the second set of time series data is associated with a cluster label; obtain a second validation of at least a subset of the second set of clusters of the second set of time series data, wherein the second validation of at least the subset of the one or more clusters of the second set of time series data comprising obtaining a second validation of the label associated with each of the sensor value in the one or more clusters of the second set of time series data, and wherein selection and validation of the subset of the second set of clusters of the second set of time series data is based on the error rate associated with the first validation of at the subset of the first set of clusters of the first set of time series data; and classifying the second set of clusters of the second set of time series data using the model file.

In an embodiment, the clustering technique is a density-based clustering technique.

In an embodiment, the first validation of at the subset of the first set of clusters of the first set of time series data and the second validation of at the subset of the second set clusters of the second set of time series data are based on at least one of (i) a user input, and (ii) meta data indicative of an operating status of the one or more sensors.

In an embodiment, validation of subsequent subsets of one or more clusters of subsequent set of time series data captured by the one or more sensors attached to the one or more equipment deployed is performed until the error rate reaches a pre-defined threshold.

In yet another aspect, there is provided a computer program product comprising a non-transitory computer readable medium having a computer readable program embodied therein, wherein the computer readable program, when executed on a computing device causes the computing device to annotate time series data and validate thereof for generating machine learning models by obtaining, at an edge device, a first set of time series data captured by one or more sensors attached to one or more equipment deployed in an industry, the first set of time series data is captured for a first time interval; applying, at the edge device, a clustering technique on the first set of time series data to obtain a first set of clusters of the first set of time series data, wherein each of a sensor value in the first set of clusters of the first set of time series data is associated with a cluster label; transmitting, by the edge device, at least a subset of the first set clusters of the first set of time series data to a cloud; obtaining, at the edge device from the cloud, a first validation of at the subset of the first set clusters of the first set of time series data, wherein the step of obtaining a first validation of at least the subset of the first set of clusters of the first set time series data comprising obtaining the first validation of the cluster label associated with each of the sensor value in the first set of clusters of the first set time series data, wherein the first validation of the cluster label associated with each of the sensor value in the first set of clusters of the first set time series data is indicative of an error rate, and wherein a machine learning technique is applied on the validated subset of the first set of clusters of the first set of time series data to generate a model file; obtaining a second set of time series data captured by the one or more sensors attached to the one or more equipment deployed in the industry, the second set of time series data is captured for a second time interval; applying the clustering technique on the second set of time series data to obtain a second set of clusters of the second set of time series data, wherein each of the sensor value in the second set of clusters of the second set of time series data is associated with a cluster label; obtaining a second validation of at least a subset of the second set of clusters of the second set of time series data, wherein the step of obtaining a second validation of at least the subset of the one or more clusters of the first time series data comprising obtaining a second validation of the label associated with each of the sensor value in the one or more clusters of the second set of time series data, and wherein selection and validation of the subset of the second set of clusters of the second set of time series data is based on the error rate associated with the first validation of at the subset of the first set of clusters of the first set of time series data; and classifying the second set of clusters of the second set of time series data using the model file.

In an embodiment, the clustering technique is a density-based clustering technique.

In an embodiment, the first validation of at the subset of the first set of clusters of the first set of time series data and the second validation of at the subset of the second set clusters of the second set of time series data are based on at least one of (i) a user input, and (ii) meta data indicative of an operating status of the one or more sensors.

In an embodiment, validation of subsequent subsets of one or more clusters of subsequent set of time series data captured by the one or more sensors attached to the one or more equipment deployed is performed until the error rate reaches a pre-defined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 depicts an exemplary flow chart illustrating a method for annotating time series data and validating thereof for generating machine learning models, using the system of FIG. 1, in accordance with an embodiment of the present disclosure.

DETAILED DESCRIPTION

Figure 1:
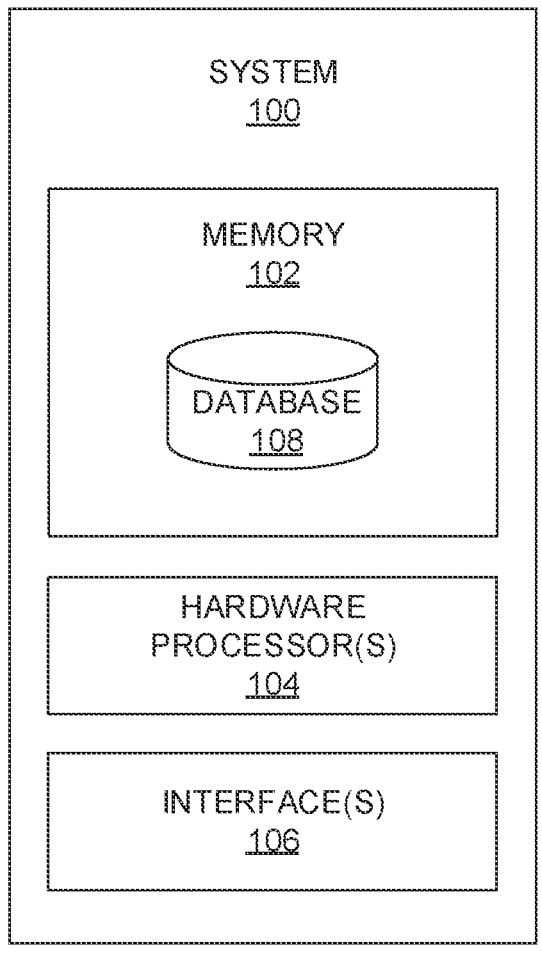
FIG. 1 depicts a system for annotating time series data and validating thereof for generating machine learning models, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned above, the major problem for applying analytics on real or real-time dataset is the scarcity of the labelled data. On the other hand, supervised machine learning (ML) models produce better performance in comparison to unsupervised machine learning models. In a real-world scenario, due to advancement of technology, volume of data has tremendously increased. With the increase of data there is cost fact effecting the nature of servicing required for the data. For instance, cost in terms of resource and time and effort is high for data annotation. Further, though data is analyzed, the analyzed data may be prone to error. Embodiments of the present disclosure provide systems and methods reduce the volume of data to be annotated by for the time series data thereby reducing the time and effort of the niche skilled person, thus results in effective utilization of system's resources (e.g., memory, processor and the like). More specifically, the method of the present disclosure adaptively modifies the volume of the data to be annotated based on the performance of the unsupervised learning method applied in the system (e.g., such as an edge device) and enable building supervised models for transmission to the edge device. Moreover, in the absence of an annotation mechanism for clusters of time series data, the system and method of the present disclosure utilizes meta data associated with the time series data. For instance, meta data may comprise log records of maintenance of equipment in an industry unit (e.g., also referred as industrial unit).

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 depicts a system 100 for annotating time series data and validating thereof for generating machine learning models, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more set of time series data captured by one or more sensors attached to various equipment/(or devices) deployed and being operated in an industry. The database 108 further stores clusters of the various set of time series data and a corresponding label for each sensory observation/sensor value in the set of time series data. The database 108 further stores information on (i) how much time series data is being transmitted from edge to cloud for processing annotation and generation of machine learning models, validation data such as the labels generated by the system 100 versus labels being annotated at the cloud (e.g., either by an automated system using meta data of the time-series data or based on user input involving manual annotation), and classification data associated with each cluster of the various time series data.

The information stored in the database 108 further comprises various techniques such as clustering technique(s), validation technique(s) as known in the art, classification technique(s) as known in the art and the like. The above-mentioned techniques comprised in the memory 102/database 108 are invoked as per the requirement by the system 100 to perform the methodologies described herein. For instance, the system 100 stores clustering technique which may be invoked for execution of the method of the present disclosure. The memory 102 further comprises (or may further comprise) information pertaining to input(s)/output (s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow chart illustrating a method for annotating time series data and validating thereof for generating machine learning models, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 is comprised in an edge device (e.g., edge device such as the system 100), wherein the one or more hardware processors 104 obtain a first set of time series data captured by one or more sensors attached to one or more equipment deployed in an industry, the first set of time series data is captured for a first time interval. For instance, time series data is captured from the one or more sensors attached with a Friction Stir Wielding (FSW) machine being deployed and/or operating in an industry (e.g., Steel or Iron manufacturing unit) or any such machine in industry. The one or more sensors of the FSW machine may include but are not limited to, force sensor, power sensor, torque sensor, and the like. Time series data from the above-mentioned sensors may include records/values of force, torque, power, revolutions per minute (rpm), velocity, ultimate tensile strength (UTS), and the like. In an embodiment, the one or more sensors are either an integral part of the FSW machine or externally connected to the FSW machine. In other words, the one or more sensors are either an integral part of a device/machine (e.g., IoT device) or externally connected to the device/machine, in one example embodiment. Such sensor values representing time-series data are captured or recorded every pre-defined time interval (e.g., say every 1 second). Below Table 1 illustrates a set of time series data captured by the one or more sensors of the FSW machine, by way of an example:

TABLE 1

| Force | Torque | RPM | Velocity | UTS | Power |
|---|---|---|---|---|---|
| 4312.0571 | 8.455 | 1383.1964 | 39.024 | 191.0587 | 4123.30783 |
| 8049.9331 | 14.062 | 990.8306 | 191.86 | 249.3077 | 4112.892414 |
| 4876.9702 | 11.392 | 998.8838 | 44.689 | 225.5982 | 4119.470396 |
| 4258.5264 | 7.298 | 1760.5524 | 57.907 | 197.9676 | 4101.930222 |
| 3828.1875 | 6.586 | 1773.9846 | 42.343 | 190.3269 | 4117.826734 |
| 4125.7461 | 6.586 | 2160.9863 | 60.654 | 194.1913 | 4133.721579 |
| 3291.3855 | 5.874 | 2560.3865 | 41.885 | 178.4046 | 4116.729848 |
| 4274.9741 | 6.942 | 1765.4681 | 40.398 | 190.3269 | 4103.573884 |
| 3845.2334 | 6.23 | 2551.2319 | 34.962 | 178.4046 | 4116.729848 |
| . . . | . . . | . . . | . . . | . . . | . . . |
| 3293.1799 | 6.052 | 2170.3088 | 41.485 | 185.7625 | 4096.449126 |
| 3998.05 | 8.366 | 1384.5734 | 41.771 | 191.0587 | 4127.69204 |
| 1471.0438 | 4.45 | 2176.4915 | 47.436 | 171.4773 | 4115.632962 |
| 4219.0513 | 6.942 | 1768.1486 | 48.752 | 195.139 | 4100.833336 |
| 4191.8369 | 7.565 | 1769.1366 | 45.833 | 195.139 | 4103.573884 |
| 5509.4692 | 8.366 | 1760.9318 | 146.599 | 218.3649 | 4138.107456 |
| 4921.8281 | 11.125 | 998.6472 | 43.03 | 225.5982 | 4121.662501 |
| 4305.1787 | 8.277 | 1380.1864 | 49.324 | 199.8093 | 4124.403049 |
| 5309.7012 | 11.481 | 1000.11 | 44.975 | 224.5843 | 4146.877543 |
| 1562.2551 | 4.628 | 1779.55 | 51.613 | 195.139 | 4121.114058 |
| 4934.0894 | 13.528 | 599.8845 | 61.111 | 215.4662 | 3666.706528 |
| 5045.9355 | 13.973 | 599.468 | 63.801 | 215.4662 | 3659.03166 |

In an embodiment, at step 204 of the present disclosure, the one or more hardware processors 104 apply a clustering technique on the first set of time series data to obtain a first set of clusters of the first set of time series data. Upon applying the clustering technique each of a sensor value in the first set of clusters of the first set of time series data is associated with a cluster label as depicted in Table 2.

TABLE 2

| Force | Torque | RPM | Velocity | UTS | Power | Label |
|---|---|---|---|---|---|---|
| 4312.0571 | 8.455 | 1383.1964 | 39.024 | 191.0587 | 4123.30783 | 0 |
| 8049.9331 | 14.062 | 990.8306 | 191.86 | 249.3077 | 4112.892414 | 0 |
| 4876.9702 | 11.392 | 998.8838 | 44.689 | 225.5982 | 4119.470396 | 0 |
| 4258.5264 | 7.298 | 1760.5524 | 57.907 | 197.9676 | 4101.930222 | 0 |
| 3828.1875 | 6.586 | 1773.9846 | 42.343 | 190.3269 | 4117.826734 | 0 |
| 4125.7461 | 6.586 | 2160.9863 | 60.654 | 194.1913 | 4133.721579 | 0 |
| 3291.3855 | 5.874 | 2560.3865 | 41.885 | 178.4046 | 4116.729848 | 1 |
| 4274.9741 | 6.942 | 1765.4681 | 40.398 | 190.3269 | 4103.573884 | 1 |
| 3845.2334 | 6.23 | 2551.2319 | 34.962 | 178.4046 | 4116.729848 | 1 |
| . . . | . . . | . . . | . . . | . . . | . . . | . . . |
| 3293.1799 | 6.052 | 2170.3088 | 41.485 | 185.7625 | 4096.449126 | 1 |
| 3998.05 | 8.366 | 1384.5734 | 41.771 | 191.0587 | 4127.69204 | 0 |
| 1471.0438 | 4.45 | 2176.4915 | 47.436 | 171.4773 | 4115.632962 | 1 |
| 4219.0513 | 6.942 | 1768.1486 | 48.752 | 195.139 | 4100.833336 | 1 |
| 4191.8369 | 7.565 | 1769.1366 | 45.833 | 195.139 | 4103.573884 | 0 |
| 5509.4692 | 8.366 | 1760.9318 | 146.599 | 218.3649 | 4138.107456 | 0 |
| 4921.8281 | 11.125 | 998.6472 | 43.03 | 225.5982 | 4121.662501 | 1 |
| 4305.1787 | 8.277 | 1380.1864 | 49.324 | 199.8093 | 4124.403049 | 1 |
| 5309.7012 | 11.481 | 1000.11 | 44.975 | 224.5843 | 4146.877543 | 0 |
| 1562.2551 | 4.628 | 1779.55 | 51.613 | 195.139 | 4121.114058 | 0 |
| 4934.0894 | 13.528 | 599.8845 | 61.111 | 215.4662 | 3666.706528 | 0 |
| 5045.9355 | 13.973 | 599.468 | 63.801 | 215.4662 | 3659.03166 | 0 |

In an embodiment, at step 206 of the present disclosure, the one or more hardware processors 104 transmit at least a subset of the first set of clusters of the first set of time series data to a cloud. The transmission of the subset of the first set of clusters of the first set of time series data to the cloud is based on a corresponding cardinality assigned to each of the clusters from the first set of clusters. In the present disclosure, the cardinality assigned to each of the first set of clusters may be in percentage value and the like, in one example embodiment. In an embodiment, a cluster of time series data having a low cardinality may be transmitted to the cloud for annotation or label correction. In another embodiment, a cluster of time series data having a medium cardinality may be transmitted to the cloud for annotation or label correction. In yet another embodiment, a cluster of time series data having a high cardinality may be transmitted to the cloud for annotation or label correction. Assuming that of the 100 records of time series data and 20% of the time series data either in a single cluster or across clusters from the first set of clusters had a cardinality either above or below a certain pre-defined threshold (e.g., wherein the threshold may be pre-determined or empirically determined based on the arrival rate, arrive time, historical pattern of the time series data, and the like). Alternatively, the clusters for transmission from the edge device/system 100 to the cloud may be randomly chosen by the system 100, wherein the samples from the time series data being transmitted to the cloud may be referred as 'most representative samples'. Number of elements to a specific cluster is referred as cardinality to that cluster, in one example embodiment of the present disclosure. The pre-defined threshold may be a value/integer ranging from 0 to 100, wherein the value/integer may be provided by one or more users as an input. Such value/integer serving the pre-defined threshold indicates expected level of accuracy. The expression 'most representative samples' herein refers to 'samples from the time series data' or at least a subset of the time series data or (equivalent number of samples from each of the cluster under consideration) that can be transmitted from the edge device to the cloud based on the available bandwidth. Bandwidth herein refers to resource available for annotation (e.g., manual annotation). Resource in one embodiment may include one or more users (e.g., subject matter expert or domain expert), cloud (e.g., a cloud server), and the like.

In an embodiment, at step 208 of the present disclosure, the one or more hardware processors 104 obtain, from the cloud, a first validation of at least the subset of the first set clusters of the first set of time series data. In an embodiment, the step of obtaining the first validation of at least the subset of the first set of clusters of the first set time series data comprising obtaining the first validation of the cluster label associated with each of the sensor value in the first set of clusters of the first set time series data. First validation of the at the subset of the first set clusters of the first set of time series data comprises corrected label for each of the cluster as depicted in Table 3 below:

TABLE 3

| Force | Torque | RPM | Velocity | UTS | Power | Label | Corrected Label |
|---|---|---|---|---|---|---|---|
| 4312.0571 | 8.455 | 1383.1964 | 39.024 | 191.0587 | 4123.30783 | 0 | 0 |
| 8049.9331 | 14.062 | 990.8306 | 191.86 | 249.3077 | 4112.892414 | 0 | 0 |
| 4876.9702 | 11.392 | 998.8838 | 44.689 | 225.5982 | 4119.470396 | 0 | 0 |
| 3845.2334 | 6.23 | 2551.2319 | 34.962 | 178.4046 | 4116.729848 | 1 | 1 |
| . . . | . . . | . . . | . . . | . . . | . . . | . . . | . . . |
| 3293.1799 | 6.052 | 2170.3088 | 41.485 | 185.7625 | 4096.449126 | 1 | 0 |
| 3998.05 | 8.366 | 1384.5734 | 41.771 | 191.0587 | 4127.69204 | 0 | 0 |
| 1471.0438 | 4.45 | 2176.4915 | 47.436 | 171.4773 | 4115.632962 | 1 | 1 |
| 4219.0513 | 6.942 | 1768.1486 | 48.752 | 195.139 | 4100.833336 | 1 | 1 |
| 4191.8369 | 7.565 | 1769.1366 | 45.833 | 195.139 | 4103.573884 | 0 | 0 |
| 5509.4692 | 8.366 | 1760.9318 | 146.599 | 218.3649 | 4138.107456 | 0 | 1 |
| 4921.8281 | 11.125 | 998.6472 | 43.03 | 225.5982 | 4121.662501 | 1 | 1 |
| 4305.1787 | 8.277 | 1380.1864 | 49.324 | 199.8093 | 4124.403049 | 1 | 1 |
| 5309.7012 | 11.481 | 1000.11 | 44.975 | 224.5843 | 4146.877543 | 0 | 1 |
| 1562.2551 | 4.628 | 1779.55 | 51.613 | 195.139 | 4121.114058 | 0 | 0 |
| 4934.0894 | 13.528 | 599.8845 | 61.111 | 215.4662 | 3666.706528 | 0 | 0 |
| 5045.9355 | 13.973 | 599.468 | 63.801 | 215.4662 | 3659.03166 | 0 | 0 |

The corrected labels (e.g., refer values in bold text in the above Table 3—for instance, from bottom and in the last column—rows 4, 7, and 12) indicate the first validation of the cluster label associated with each of the sensor value in the first set of clusters of the first set time series data. More specifically, the first validation is indicative of an error rate. In an embodiment, a machine learning technique is applied on the validated subset of the first set of clusters of the first set of time series data to generate a model file. For instance, machine learning technique such as Support Vector Classifier comprised in the memory 102 is applied on the validated subset of the first set of clusters of the first set of time series data to generate a model file.

In an embodiment, at step 210 of the present disclosure, the one or more hardware processors 104 obtain a second set of time series data captured by the one or more sensors attached to the one or more equipment deployed in the industry, the second set of time series data is captured for a second time interval. Below Table 4 depicts a second set of time series data by way of example:

TABLE 4

| Force | Torque | RPM | Velocity | UTS | Power |
|---|---|---|---|---|---|
| 4312.0571 | 8.455 | 1383.1964 | 39.024 | 191.0587 | 4123.30783 |
| 8049.9331 | 14.062 | 990.8306 | 191.86 | 249.3077 | 4112.892414 |
| 4876.9702 | 11.392 | 998.8838 | 44.689 | 225.5982 | 4119.470396 |
| 4258.5264 | 7.298 | 1760.5524 | 57.907 | 197.9676 | 4101.930222 |
| 3828.1875 | 6.586 | 1773.9846 | 42.343 | 190.3269 | 4117.826734 |
| 4125.7461 | 6.586 | 2160.9863 | 60.654 | 194.1913 | 4133.721579 |
| 3291.3855 | 5.874 | 2560.3865 | 41.885 | 178.4046 | 4116.729848 |
| 4274.9741 | 6.942 | 1765.4681 | 40.398 | 190.3269 | 4103.573884 |
| 3845.2334 | 6.23 | 2551.2319 | 34.962 | 178.4046 | 4116.729848 |
| . . . | . . . | . . . | . . . | . . . | . . . |
| 3293.1799 | 6.052 | 2170.3088 | 41.485 | 185.7625 | 4096.449126 |
| 3998.05 | 8.366 | 1384.5734 | 41.771 | 191.0587 | 4127.69204 |
| 1471.0438 | 4.45 | 2176.4915 | 47.436 | 171.4773 | 4115.632962 |
| 4219.0513 | 6.942 | 1768.1486 | 48.752 | 195.139 | 4100.833336 |
| 4191.8369 | 7.565 | 1769.1366 | 45.833 | 195.139 | 4103.573884 |
| 5509.4692 | 8.366 | 1760.9318 | 146.599 | 218.3649 | 4138.107456 |
| 4921.8281 | 11.125 | 998.6472 | 43.03 | 225.5982 | 4121.662501 |
| 4305.1787 | 8.277 | 1380.1864 | 49.324 | 199.8093 | 4124.403049 |
| 5309.7012 | 11.481 | 1000.11 | 44.975 | 224.5843 | 4146.877543 |
| 1562.2551 | 4.628 | 1779.55 | 51.613 | 195.139 | 4121.114058 |
| 4934.0894 | 13.528 | 599.8845 | 61.111 | 215.4662 | 3666.706528 |
| 5045.9355 | 13.973 | 599.468 | 63.801 | 215.4662 | 3659.03166 |

Similar to step 204, at step 212 of the present disclosure, the one or more hardware processors 104 apply the clustering technique on the second set of time series data to obtain a second set of clusters of the second set of time series data, wherein each of the sensor value in the second set of clusters of the second set of time series data is associated with a cluster label. In an embodiment, the clustering technique is a density-based clustering technique that is applied on the first set of time series data and the second set of time series data to obtain the first set of clusters and the second set of clusters respectively. More specifically, Hierarchical Density-Based Spatial Clustering of Applications with Noise (HDBSCAN) clustering technique was applied on the first set of time series data and the second set of time series data to obtain the first set of clusters and the second set of clusters respectively, in one example embodiment of the present disclosure.

In an embodiment, at step 214 of the present disclosure, the one or more hardware processors 104 obtain a second validation of a subset of the second set of clusters of the second set of time series data. In an embodiment, the step of obtaining the second validation of at the subset of the one or more clusters of the second set of time series data comprising obtaining the second validation of the label associated with each of the sensor value in the one or more clusters of the second set of time series data. The selection and validation of the subset of the second set of clusters of the second set of time series data is based on the error rate associated with the first validation of at the subset of the first set of clusters of the first set of time series data. In other words, the amount of second set of time series data to be transmitted from the edge device to the cloud is decided based on the error rate determined using the steps 204 and 206. In other words, based on the number of corrected label in step 206 for each of the clusters obtained in step 204, the amount of second set of time series data to be transmitted to the cloud by the edge device is decided. It is to be understood by a person having ordinary skill in the art or person skilled in the art that validation may be performed at the cloud based on the error rate (if negligible in the first validation) and hence the transmission of the subset of the second set of clusters of the second set of time series data. The error rate herein refers to an expected level of accuracy that is set in the system 100, wherein the error rate may be in integer or a value or in percentage. Consider that the validation has resulted in system accuracy of 85% on previously unseen data (e.g., second set of time series data), then the expected level of accuracy by the system/edge device 100 would be greater than or equal to 85% expected level of accuracy for the new data), in one example embodiment.

Below Table 5 depicts an exemplary validated set of time series data indicative of second validation of a subset of the second set of clusters of the second set of time series data:

TABLE 5

| Force | Torque | RPM | Velocity | UTS | Power | Label |
|---|---|---|---|---|---|---|
| 4312.0571 | 8.455 | 1383.1964 | 39.024 | 191.0587 | 4123.30783 | 0 |
| 8049.9331 | 14.062 | 990.8306 | 191.86 | 249.3077 | 4112.892414 | 0 |
| 4876.9702 | 11.392 | 998.8838 | 44.689 | 225.5982 | 4119.470396 | 0 |
| 4258.5264 | 7.298 | 1760.5524 | 57.907 | 197.9676 | 4101.930222 | 0 |
| 3828.1875 | 6.586 | 1773.9846 | 42.343 | 190.3269 | 4117.826734 | 0 |
| 4125.7461 | 6.586 | 2160.9863 | 60.654 | 194.1913 | 4133.721579 | 0 |
| 3291.3855 | 5.874 | 2560.3865 | 41.885 | 178.4046 | 4116.729848 | 1 |
| 4274.9741 | 6.942 | 1765.4681 | 40.398 | 190.3269 | 4103.573884 | 1 |
| 3845.2334 | 6.23 | 2551.2319 | 34.962 | 178.4046 | 4116.729848 | 1 |
| . . . | . . . | . . . | . . . | . . . | . . . | . . . |
| 3293.1799 | 6.052 | 2170.3088 | 41.485 | 185.7625 | 4096.449126 | 0 (corrected) |
| 3998.05 | 8.366 | 1384.5734 | 41.771 | 191.0587 | 4127.69204 | 0 |
| 1471.0438 | 4.45 | 2176.4915 | 47.436 | 171.4773 | 4115.632962 | 1 |
| 4219.0513 | 6.942 | 1768.1486 | 48.752 | 195.139 | 4100.833336 | 0 (corrected) |
| 4191.8369 | 7.565 | 1769.1366 | 45.833 | 195.139 | 4103.573884 | 0 |
| 5509.4692 | 8.366 | 1760.9318 | 146.599 | 218.3649 | 4138.107456 | 1 (corrected) |
| 4921.8281 | 11.125 | 998.6472 | 43.03 | 225.5982 | 4121.662501 | 1 |
| 4305.1787 | 8.277 | 1380.1864 | 49.324 | 199.8093 | 4124.403049 | 1 |
| 5309.7012 | 11.481 | 1000.11 | 44.975 | 224.5843 | 4146.877543 | 1 (corrected) |
| 1562.2551 | 4.628 | 1779.55 | 51.613 | 195.139 | 4121.114058 | 0 |
| 4934.0894 | 13.528 | 599.8845 | 61.111 | 215.4662 | 3666.706528 | 0 |
| 5045.9355 | 13.973 | 599.468 | 63.801 | 215.4662 | 3659.03166 | 0 |

In an embodiment, the first validation of at the subset of the first set of clusters of the first set of time series data and the second validation of at the subset of the second set clusters of the second set of time series data are based on at least one of (i) a user input, and (ii) meta data indicative of an operating status of the one or more sensors. In other words, the first validation and the second validation may be either performed by at least one of (i) the cloud itself, (ii) a user such as a domain expert (DE) (or a subject matter expert (SME)), and (iii) meta data indicative of an operating status of the one or more sensors. The meta data indicative of an operating status of the one or more sensors comprises of log records of each value of the one or more sensors and its characteristics. Meta data is the data about the data. Often the failure of a machine is logged in a logbook. That record can be used to annotate the time series, in one example embodiment of the present disclosure. If there is an involvement of a user such as DE or SME for the first validation and the second validation (e.g., if DE or SME provides his/her inputs in validation of the labels associated with sensor values comprised in each of the clusters), then the system 100 learns (or may learn) the pattern of label correction and applies the learnings on the new incoming time series data to reduce the error rate. The system 100 learns (or may learn) label correct or validation even when the label correction/validation is performed by a system/cloud itself. In other words, the system 100 (or the edge device) learns the validation irrespective of which entity (e.g., cloud, or DE/SME or both) has performed the validation. The learning of validation enables the system 100 to automatically decide whether time series data from the clusters of an incoming time series data needs to be transmitted from the edge device to the cloud. In above Table 5, the cluster label having expression '(corrected)' and marked in bold text indicates that the system 100 was able to perform validation of the labels or cluster label correction on its own or assign a correct cluster label to each of the cluster on its own by applying the learnings from the previous iteration without having to transmit the second set of clusters of the second time series data to the cloud for annotation. This automatic decision enables the system 100 to analyse and validate the time series data for further processing such as model file generation, classification of the clusters of time series data and the like. The automatic decision further enables the system to intelligently utilize resources (various components—such as memory 102, processor(s) 104, and the like) of the system 100 for further processing. Such automatic and intelligent decisions enable faster processing and optimization of the various components of the system thereby leading to better performance of the system 100.

The transmission of entire set of clusters of specific time series data from a specific set of clusters can be further reduced based on the error rate. This also means that validation of subsequent subsets of one or more clusters of subsequent set of time series data captured by the one or more sensors attached to equipment is performed until the error rate reaches a pre-defined threshold. Once the error reaches a certain threshold as mentioned above the system 100 can perform validation by itself and process the validated time series data for model file generation and classification of the associated clusters.

Post obtaining the second validation of at least the subset of the second set of clusters of the second set of time series data, at step 212 of the present disclosure, the one or more hardware processors 104 classify the second set of clusters of the second set of time series data using the model file.

Embodiments of the present disclosure provide systems and methods for annotating time series data and validating thereof for generating machine learning models. In the present disclosure, a light-weight real time online training is applied on edge to cluster the input data stream in an unsupervised manner. The expression 'light-weight real time online training' refers to 'once the model has been created in the first iteration, that model is transferred to edge using over the air (OTA) communication channel. Now that model is used to validate the outcome of clustering in the edge. By transmission of a snippet of specific cluster from the edge device to cloud enables an approximate reduction of bandwidth usage (e.g., memory, processor(s), utilization of DE/SME and the like). Moreover, in the absence of DE/SME validation, the system 100 performs annotation or label correction/validation using the meta data derived from the time series data captured by various sensors. For instance, as mentioned above, the system 100 can use log record of maintenance of a manufacturing industry or log record of maintenance of the FSW machine, in one example embodiment. The validated time series data or the time series data from the set of clusters post validation is then used to train a model using machine learning techniques. In an embodiment of the present disclosure the model is trained using at least one of (i) un-supervised ML technique, (ii) a semi-supervised ML technique, and (iii) a supervised ML technique. The model may be trained either in the edge device (e.g., system 100) and/or in the cloud. In case the model is trained in the cloud, then the learned model is obtained the system 100 (e.g., or the edge device) from the cloud using one or more communication channels (e.g., over the air transmission channel, and the like).

Further, ensambling of the supervised and un-supervised learning is applied for the next iteration in the edge device for new incoming time series data that enables improving accuracy of clustering of new time series data, validation and classification of clusters of the new time series data. Such iterative process generating various output through steps described from 202 till 214 enable the system 100 to generate new set of results that can further enable the system 100 to automatically perform the annotation.

Moreover, conventionally, state of the art talks described a reinforcement learning strategy to reduce label cost, whereas in the present disclosure, systems and methods apply an approach first (e.g., such as an unsupervised approach) to reduce the annotated sample space there after applying the semi-supervised based approach with reduced annotated sample space. The systems and methods of the present disclosure can be implemented in practical applications involving IoT networks (or IoT scenarios), machineries, various equipment in manufacturing, production, service line, healthcare, hospitality industries/units wherein data is captured from various sensors that are attached to devices/equipment operating in these units.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for annotating time series data and validating thereof for generating machine learning models, the processor implemented method comprising:

obtaining, at an edge device, a first set of time series data captured by one or more sensors attached to one or more equipment deployed in an industry, wherein the first set of time series data is captured for a first time interval, wherein the one or more equipment include a Friction Stir Welding (FSW) machine or an IoT device, wherein the one or more sensors attached to the one or more equipment include a force sensor, a power sensor or a torque sensor and the first set of time series data from the one or more sensors include values of force, torque, power, revolutions per minute (rpm), velocity, and ultimate tensile strength (UTS), and wherein the one or more sensors are either an integral part of the FSW machine or the IoT device or externally connected to the FSW machine or the IoT device;

applying, at the edge device, a clustering technique on the first set of time series data to obtain a first set of clusters of the first set of time series data, wherein each of a sensor value in the first set of clusters of the first set of time series data is associated with a cluster label;

transmitting, by the edge device, at least a subset of the first set of clusters of the first set of time series data to a cloud based on a corresponding cardinality assigned to each of the clusters from the first set of clusters in a percentage value, wherein the cluster of time series data with one of a low cardinality, a medium cardinality or a high cardinality is transmitted to the cloud for annotation or label correction, and wherein the clusters from the first set of clusters have a cardinality either above or below a pre-defined or empirically determined threshold based on the arrival rate, arrive time, and historical pattern of the time series data, wherein the transmission of the subset of the first set of clusters of the first set of time series data from the edge device to the cloud by reducing bandwidth usage;

obtaining, at the edge device from the cloud, a first validation of at the subset of the first set clusters of the first set of time series data, wherein the step of obtaining the first validation of at least the subset of the first set of clusters of the first set time series data comprising obtaining the first validation of the cluster label associated with each of the sensor value in the first set of clusters of the first set time series data, wherein the first validation of the cluster label associated with each of the sensor value in the first set of clusters of the first set time series data is indicative of an error rate, wherein the first validation of the subset of the first set clusters of the first set of time series data comprises a corrected label for each of the cluster, and wherein a machine learning (ML) technique is applied on the validated subset of the first set of clusters of the first set of time series data to generate a model file;

obtaining, at the edge device, a second set of time series data captured by the one or more sensors attached to the one or more equipment deployed in the industry, wherein the second set of time series data is captured for a second time interval;

applying the clustering technique on the second set of time series data to obtain a second set of clusters of the second set of time series data, wherein each of the sensor value in the second set of clusters of the second set of time series data is associated with a cluster label;

obtaining a second validation of at least a subset of the second set of clusters of the second set of time series data, wherein the step of obtaining the second validation of at least the subset of the one or more clusters of the second set of time series data comprising obtaining a second validation of the cluster label associated with each of the sensor value in the one or more clusters of the second set of time series data, and wherein selection and validation of the subset of the second set of clusters of the second set of time series data is based on the error rate associated with the first validation of the subset of the first set of clusters of the first set of time series data, wherein the error rate refers to an expected level of accuracy that is set in the edge device, wherein the error rate is represented as an integer or a value or a percentage, wherein an amount of the second set of time series data to be transmitted to the cloud by the edge device is decided based on a number of the corrected label for each of the first set of clusters of the first set of time series data, wherein the first validation and the second validation is performed by at least one of the cloud, a domain expert and based on metadata indicative of an operating status of the one or more sensors, and wherein the metadata comprises log records of each value of the one or more sensors and associated characteristics;

learning, by the edge device, a pattern of the label correction and applying the learnings on the second set of time series data to reduce the error rate, wherein the edge device learns the label correction or the first validation even when the label correction or the first validation is performed by the cloud, wherein the learnings of the first validation enables the edge device to automatically decide whether the second time series data from second set of clusters of the second time series data has to be transmitted from the edge device to the cloud, wherein the edge device performs the second validation by applying the learnings from previous iteration without having to transmit the second set of clusters of the second time series data to the cloud for annotation, and wherein the automatic decision enables the edge device to optimize utilization of resources including a memory, a processor of the edge device for further processing;

training, by the edge device, a model using at least one ML technique based on the first validation and the second validation to automatically decide whether the first set of time series data and the second set of time series data has to be transmitted from the edge device to the cloud, wherein the at least one ML technique comprises (i) un-supervised ML technique, (ii) a semi-supervised ML technique, and (iii) a supervised ML technique;

classifying the second set of clusters of the second set of time series data using the model file; and applying an ensemble of the supervised ML technique and the un-supervised ML technique in the edge device for new incoming time series data and iteratively performing the steps of applying the clustering technique on the first set of time series data to obtain the first set of clusters till obtaining the second validation, results in generating new set of results enabling automatic annotation of the new incoming time series data by the edge device.

2. The processor implemented method of claim 1, wherein the clustering technique is a density-based clustering technique, wherein when the model is trained in the cloud, then the model is transmitted from the cloud to the edge device using over the air (OTA) communication channel for applying the training on the edge device to validate outcome of the clustering in the edge device.

3. The processor implemented method of claim 1, wherein validation of subsequent subsets of one or more clusters of subsequent set of time series data captured by the one or more sensors attached to equipment is performed until the error rate reaches a pre-defined threshold.

4. A system, comprising:

a memory storing instructions;

one or more communication interfaces; and one or more hardware processors coupled to the memory via the one or more communication interfaces, the one or more hardware processors being comprises in an edge device, wherein the one or more hardware processors are configured by the instructions to:

obtain a first set of time series data captured by one or more sensors attached to one or more equipment deployed in an industry, wherein the first set of time series data is captured for a first time interval, wherein the one or more equipment include a Friction Stir Welding (FSW) machine or an IoT device, wherein the one or more sensors attached to the one or more equipment include a force sensor, a power sensor or a torque sensor and the first set of time series data from the one or more sensors include values of force, torque, power, revolutions per minute (rpm), velocity, and ultimate tensile strength (UTS), and wherein the one or more sensors are either an integral part of the FSW machine or the IoT device or externally connected to the FSW machine or the IoT device;

apply a clustering technique on the first set of time series data to obtain a first set of clusters of the first set of time series data, wherein each of a sensor value in the first set of clusters of the first set of time series data is associated with a cluster label (204);

transmit at least a subset of the first set of clusters of the first set of time series data to a cloud based on a corresponding cardinality assigned to each of the clusters from the first set of clusters in a percentage value, wherein the cluster of time series data with one of a low cardinality, a medium cardinality or a high cardinality is transmitted to the cloud for annotation or label correction, and wherein the clusters from the first set of clusters have a cardinality either above or below a pre-defined or empirically determined threshold based on the arrival rate, arrive time, and historical pattern of the time series data, wherein the transmission of the subset of the first set of clusters of the first set of time series data from the edge device to the cloud by reducing bandwidth usage;

obtain, from the cloud, a first validation of at the subset of the first set clusters of the first set of time series data, wherein the step of obtaining a first validation of at least the subset of the first set of clusters of the first set time series data comprising obtaining the first validation of the cluster label associated with each of the sensor value in the first set of clusters of the first set time series data, wherein the first validation of the cluster label associated with each of the sensor value in the first set of clusters of the first set time series data is indicative of an error rate, wherein the first validation of the subset of the first set clusters of the first set of time series data comprises a corrected label for each of the cluster, and wherein a machine learning (ML)

technique is applied on the validated subset of the first set of clusters of the first set of time series data to generate a model file;

obtain a second set of time series data captured by the one or more sensors attached to the one or more equipment deployed in the industry, wherein the second set of time series data is captured for a second time interval;

apply the clustering technique on the second set of time series data to obtain a second set of clusters of the second set of time series data, wherein each of the sensor value in the second set of clusters of the second set of time series data is associated with a cluster label;

obtain a second validation of at least a subset of the second set of clusters of the second set of time series data, wherein the step of obtaining a second validation of at least the subset of the one or more clusters of the second set of time series data comprising obtaining a second validation of the cluster label associated with each of the sensor value in the one or more clusters of the second set of time series data, and wherein selection and validation of the subset of the second set of clusters of the second set of time series data is based on the error rate associated with the first validation of the subset of the first set of clusters of the first set of time series data (214), wherein the error rate refers to an expected level of accuracy that is set in the edge device, wherein the error rate is represented as an integer or a value or a percentage, wherein an amount of the second set of time series data to be transmitted to the cloud by the edge device is decided based on a number of the corrected label for each of the first set of clusters of the first set of time series data, wherein the first validation and the second validation is performed by at least one of the cloud, a domain expert and based on metadata indicative of an operating status of the one or more sensors, and wherein the metadata comprises log records of each value of the one or more sensors and associated characteristics;

learn, by the edge device, a pattern of the label correction and applying the learnings on the second set of time series data to reduce the error rate, wherein the edge device learns the label correction or the first validation even when the label correction or the first validation is performed by the cloud, wherein the learnings of the first validation enables the edge device to automatically decide whether the second time series data from second set of clusters of the second time series data has to be transmitted from the edge device to the cloud, wherein the edge device performs the second validation by applying the learnings from previous iteration without having to transmit the second set of clusters of the second time series data to the cloud for annotation, and wherein the automatic decision enables the edge device to optimize utilization of resources including the memory, the one or more hardware processors of the edge device for further processing;

train, by the edge device, a model using at least one ML technique based on the first validation and the second validation to automatically decide whether the first set of time series data and the second set of time series data has to be transmitted from the edge device to the cloud, wherein the at least one ML technique comprises (i) un-supervised ML technique, (ii) a semi-supervised ML technique, and (iii) a supervised ML technique;

classify the second set of clusters of the second set of time series data using the model file; and apply an ensemble of the supervised ML technique and
the un-supervised ML technique in the edge device for
new incoming time series data and iteratively perform-
ing the steps of applying the clustering technique on the
first set of time series data to obtain the first set of clusters till obtaining the second validation, results in
generating new set of results enabling automatic anno-
tation of the new incoming time series data by the edge
device.

5. The system of claim 4, wherein the clustering technique is a density-based clustering technique.

6. The system of claim 4, wherein validation of subse-
quent subsets of one or more clusters of subsequent set of
time series data captured by the one or more sensors attached
to equipment is performed until the error rate reaches a
pre-defined threshold.

7. A computer program product comprising a non-transi-
tory computer readable medium having a computer readable
program embodied therein, wherein the computer readable
program, when executed on a computing device causes the
computing device to annotate time series data and validate
thereof for generating machine learning models by:

obtaining, at an edge device, a first set of time series data
captured by one or more sensors attached to one or
more equipment deployed in an industry, wherein the
first set of time series data is captured for a first time
interval, wherein the one or more equipment include a
Friction Stir Welding (FSW) machine or an IoT device,
wherein the one or more sensors attached to the one or
more equipment include a force sensor, a power sensor
or a torque sensor and the first set of time series data
from the one or more sensors include values of force,
torque, power, revolutions per minute (rpm), velocity,
and ultimate tensile strength (UTS), and wherein the
one or more sensors are either an integral part of the
FSW machine or the IoT device or externally connected
to the FSW machine or the IoT device;

applying, at the edge device, a clustering technique on the
first set of time series data to obtain a first set of clusters
of the first set of time series data, wherein each of a
sensor value in the first set of clusters of the first set of
time series data is associated with a cluster label;

transmitting, by the edge device, at least a subset of the
first set of clusters of the first set of time series data to
a cloud based on a corresponding cardinality assigned
to each of the clusters from the first set of clusters in a
percentage value, wherein the cluster of time series data
with one of a low cardinality, a medium cardinality or
a high cardinality is transmitted to the cloud for anno-
tation or label correction, and wherein the clusters from
the first set of clusters have a cardinality either above
or below a pre-defined or empirically determined
threshold based on the arrival rate, arrive time, and
historical pattern of the time series data, wherein the
transmission of the subset of the first set of clusters of
the first set of time series data from the edge device to
the cloud by reducing bandwidth usage;

obtaining, at the edge device from the cloud, a first
validation of at the subset of the first set clusters of the
first set of time series data, wherein the step of obtaining a first validation of at least the subset of the first set
of clusters of the first set time series data comprising
obtaining the first validation of the cluster label asso-
ciated with each of the sensor value in the first set of
clusters of the first set time series data, wherein the first
validation of the cluster label associated with each of
the sensor value in the first set of clusters of the first set time series data is indicative of an error rate, wherein
the first validation of the subset of the first set clusters
of the first set of time series data comprises a corrected
label for each of the cluster, and wherein a machine
learning (ML) technique is applied on the validated
subset of the first set of clusters of the first set of time
series data to generate a model file;

obtaining a second set of time series data captured by the
one or more sensors attached to the one or more
equipment deployed in the industry, wherein the second
set of time series data is captured for a second time
interval;

applying the clustering technique on the second set of
time series data to obtain a second set of clusters of the
second set of time series data, wherein each of the
sensor value in the second set of clusters of the second
set of time series data is associated with a cluster label;

obtaining a second validation of at least a subset of the
second set of clusters of the second set of time series
data, wherein the step of obtaining a second validation
of at least the subset of the one or more clusters of the
first time series data comprising obtaining a second
validation of the cluster label associated with each of
the sensor value in the one or more clusters of the
second set of time series data, and wherein selection
and validation of the subset of the second set of clusters
of the second set of time series data is based on the error
rate associated with the first validation of the subset of
the first set of clusters of the first set of time series data,
wherein the error rate refers to an expected level of
accuracy that is set in the edge device, wherein the error
rate is represented as an integer or a value or a
percentage, wherein an amount of the second set of
time series data to be transmitted to the cloud by the
edge device is decided based on a number of the
corrected label for each of the first set of clusters of the
first set of time series data, wherein the first validation
and the second validation is performed by at least one
of the cloud, a domain expert and based on metadata
indicative of an operating status of the one or more
sensors, and wherein the metadata comprises log
records of each value of the one or more sensors and
associated characteristics;

learning, by the edge device, a pattern of the label
correction and applying the learnings on the second set
of time series data to reduce the error rate, wherein the
edge device learns the label correction or the first
validation even when the label correction or the first
validation is performed by the cloud, wherein the
learnings of the first validation enables the edge device
to automatically decide whether the second time series
data from second set of clusters of the second time
series data has to be transmitted from the edge device
to the cloud, wherein the edge device performs the
second validation by applying the learnings from pre-
vious iteration without having to transmit the second
set of clusters of the second time series data to the cloud
for annotation, and wherein the automatic decision
enables the edge device to optimize utilization of
resources including a memory, a processor of the edge
device for further processing;

training, by the edge device, a model using at least one
ML technique based on the first validation and the
second validation to automatically decide whether the
first set of time series data and the second set of time
series data has to be transmitted from the edge device
to the cloud, wherein the at least one ML technique comprises (i) un-supervised ML technique, (ii) a semi-supervised ML technique, and (iii) a supervised ML technique;

classifying the second set of clusters of the second set of time series data using the model file; and applying an ensemble of the supervised ML technique and the un-supervised ML technique in the edge device for new incoming time series data and iteratively performing the steps of applying the clustering technique on the first set of time series data to obtain the first set of clusters till obtaining the second validation, results in generating new set of results enabling automatic annotation of the new incoming time series data by the edge device.

8. The computer program product comprising a non-transitory computer readable medium of claim 7, wherein the clustering technique is a density-based clustering technique.

9. The computer program product comprising a non-transitory computer readable medium of claim 7, wherein validation of subsequent subsets of one or more clusters of subsequent set of time series data captured by the one or more sensors attached to equipment is performed until the error rate reaches a pre-defined threshold.

\*   \*   \*   \*   \*